United States Patent
Lee

(10) Patent No.: US 7,142,896 B2
(45) Date of Patent: Nov. 28, 2006

(54) METHOD AND APPARATUS FOR REDUCING POWER CONSUMPTION OF SLOTTED MODE MOBILE COMMUNICATION TERMINAL

(75) Inventor: Ju-Bong Lee, Anyang-shi (KR)

(73) Assignee: Samsung Electronics Co., Ltd. (KR)

( * ) Notice: Subject to any disclaimer, the term of this patent is extended or adjusted under 35 U.S.C. 154(b) by 487 days.

(21) Appl. No.: 10/347,012

(22) Filed: Jan. 17, 2003

(65) Prior Publication Data

US 2003/0148800 A1 Aug. 7, 2003

(30) Foreign Application Priority Data

Jan. 17, 2002 (KR) .................. 2002-2763

(51) Int. Cl.
 H04B 1/38 (2006.01)
 H04B 1/16 (2006.01)
(52) U.S. Cl. ............... 455/574; 455/343.2; 455/343.4; 370/311
(58) Field of Classification Search ............... 455/574, 455/343.1, 343.2, 343.4; 340/7.32, 7.33, 340/7.36; 370/311, 320, 335, 342, 515
See application file for complete search history.

(56) References Cited

U.S. PATENT DOCUMENTS

| | | | | |
|---|---|---|---|---|
| 5,745,860 | A * | 4/1998 | Kallin | 455/574 |
| 5,910,944 | A * | 6/1999 | Callicotte et al. | 370/311 |
| 5,930,706 | A * | 7/1999 | Raith | 455/422.1 |
| 5,978,366 | A * | 11/1999 | Massingill et al. | 370/337 |
| 6,016,312 | A * | 1/2000 | Storm et al. | 370/311 |
| 6,101,173 | A * | 8/2000 | Bayley | 370/311 |
| 6,246,875 | B1 * | 6/2001 | Seazholtz et al. | 455/432.1 |
| 6,289,228 | B1 * | 9/2001 | Rotstein et al. | 455/574 |
| 6,453,181 | B1 * | 9/2002 | Challa et al. | 455/574 |
| 6,795,425 | B1 * | 9/2004 | Raith | 370/345 |
| 6,937,578 | B1 * | 8/2005 | Hunzinger | 370/311 |
| 2002/0086720 | A1 * | 7/2002 | Kim | 455/574 |

* cited by examiner

Primary Examiner—Binh K. Tieu
(74) Attorney, Agent, or Firm—Dilworth & Barrese, LLP

(57) ABSTRACT

A method and apparatus for reducing power consumption of a mobile communication terminal operated at a slotted mode in a spread spectrum communication system such as a CDMA cellular mobile communication system. The mobile communication terminal reduces a paging channel monitoring time by entering a sleep mode or a wake-up mode at an arbitrary timing instead of a PN code rollover period, resulting in the increment of a standby time of the terminal.

4 Claims, 7 Drawing Sheets

METHOD AND APPARATUS FOR REDUCING POWER CONSUMPTION OF SLOTTED MODE MOBILE COMMUNICATION TERMINAL

PRIORITY

This application claims priority to an application entitled "METHOD AND APPARATUS FOR REDUCING POWER CONSUMPTION OF SLOTTED MODE MOBILE COMMUNICATION TERMINAL", filed in the Korean Industrial Property Office on Jan. 17, 2002 and assigned Serial No. 2002-2763, the contents of which are hereby incorporated by reference herein.

BACKGROUND OF THE INVENTION

1. Field of the Invention

The present invention relates to a mobile communication terminal, and more particularly to a method and apparatus for reducing power consumption of a mobile communication terminal in a spread spectrum communication system such as a CDMA (Code Division Multiple Access) cellular mobile communication system.

2. Description of the Related Art

It is well known in the art that a spread spectrum communication system such as a CDMA cellular mobile communication system divides the whole service area into a plurality of cells, manages the cells by many base stations (BSs) using the same radio frequency (RF), and centrally manages the base stations by a MSC (Mobile Switching Center). The base stations are respectively assigned unique PN (Pseudo-random Noise) spreading codes so that the MSC can readily identify each base station.

In such a CDMA cellular mobile communication system, a base station transmits signals to the outside via a pilot channel, a synchronous channel, and a paging channel as well as a traffic channel for supporting the exchange of voice or data. The pilot channel transmits signals of a predetermined level, which are composed of the same bit values and are covered by a Walsh code "0", and is used for CDMA cellular mobile communication system identification, system acquisition initialization, standby state hand-off, and coherent demodulation of demodulation/paging/traffic channels. Particularly, the mobile communication terminal acquires a pilot symbol from the pilot channel, and determines on the basis of the acquired paging symbol which one of many paging channels received from neighbor base stations is to be demodulated.

FIG. 1 is a flow chart illustrating a conventional procedure of monitoring a paging channel.

As shown in FIG. 1, a mobile communication terminal provides a communication circuitry needed to manage a radio signal with a power-supply voltage after receiving a wake-up signal at step S110. As known in the art, the communication circuitry contains a radio frequency (RF) unit, a demodulator having a searcher, and a DSP (Digital Signal Processor) having a call control processor. After the mobile communication terminal has been woken up at step S110, the mobile communication terminal acquires a pilot symbol on a pilot channel from a base station by means of the communication circuitry at step S120. After the pilot symbol on the pilot channel has been acquired at step S120, the mobile communication terminal establishes a synchronization acquisition to achieve time-alignment with the base station at step S130.

After the synchronization acquisition has been made at step S130, the mobile communication terminal monitors all paging channels successively (i.e., non-slotted mode) or periodically (i.e., slotted mode) at step S140, and determines at step S150 whether a paging channel message is detected or not on the basis of the monitoring result. In the case where the paging channel message has been detected at step S150, the mobile communication terminal processes the detected paging channel message at step S180. But, in the case where no paging channel message has been detected at step S150, the mobile communication terminal determines at step S160 whether all valid paging channels are completely monitored. If it is determined at step S160 that all valid paging channels have not been completely monitored, the mobile communication terminal tunes a current paging channel to another paging channel at step S170 and returns to step S140. In the case where it is determined that no paging channel message has been detected at step S150 and all valid paging channels have been completely monitored at step S160, or the paging channel message has been completely processed at step S180, the mobile communication terminal cuts off the power-supply voltage for the communication circuitry by entering a sleep mode at step S190.

As for a CDMA mobile communication terminal such as the above mobile communication terminal of FIG. 1, the mobile communication terminal is operated at a slotted mode during a predetermined period of time where a call connection state is not made, thereby increasing a standby time and a system efficiency. In the slotted mode, a unique timeslot is assigned to every mobile communication terminal, and then the mobile communication terminal is woken up within its own timeslot to monitor a paging channel of a base station but remains in a sleep mode in the remaining timeslots. The slotted mode may considerably reduce power consumption of the mobile communication terminal in the standby state because the communication circuitry of the mobile communication terminal needs not receive a power-supply voltage in the slotted mode.

FIG. 2 is a view showing conventional paging channel slots of the CDMA mobile communication system.

Referring to FIG. 2, the conventional paging channel is composed of 16 paging channel slots that are periodically repeated. Three such slots, N−1, N and N+1 are shown in FIG. 2. Each paging channel slot has a time period of 80 ms. During the time period of 80 ms, a rollover period of 26.667 ms of a PN (pseudo-noise) generator can be thrice repeated and one frame of 20 ms can be repeated four times. Each paging slot is composed of 64 pilot channel groups (PCGs) that respectively contain 18 pilot symbols.

In case of the above paging channel, each mobile communication terminal is allocated to one predetermined slot among the 16 paging channel slots, and is woken up before its own allocated slot so it may monitor its own allocated corresponding paging channel slot. The mobile communication terminal remains in a sleep mode in the remaining paging channel slots. Such a mobile communication terminal is called "slotted mode mobile communication terminal".

The slotted mode mobile communication terminal determines a sleep mode entering timing on the basis of the rollover period of 26.667 ms of a PN code of a PN generator in a CDMA mobile communication system. In other words, a control unit of the mobile communication terminal generates periodic PN roll signals in response to the PN code rollover period of the PN generator, resulting in a power-off state of the communication circuitry. After an elapsing of the sleep mode, the mobile communication terminal is woken up on the basis of the periodic PN rollover signals. The reason why the mobile communication terminal enters the sleep mode or the wake-up mode on the basis of the PN code rollover period (i.e., a period of the PN rollover signals) is that the mobile communication terminal may quickly establish synchronization re-acquisition with a base station because the PN generators of the mobile communication terminal consistently enter the sleep mode and wake-up mode based on the timing of the PN code rollover period.

In this case, in order to enter the sleep mode after determining that there are no paging channel message in the allocated paging channel or after processing a paging message, the control unit of the mobile communication terminal prepares hardware setup parameters needed to enter the sleep mode, finishes a hardware setup of the communication circuitry for the sleep mode, and commands the communication circuitry to enter the sleep mode. As a result, the communication circuitry is actually in the sleep mode after all the hardwares have been completely set up. Therefore, even if the control unit of the mobile communication terminal determines the sleep mode and commands the communication circuitry to enter it, the sleep mode initiation timing of the communication circuitry may be delayed by a period of time that can equal the rollover period of 26.667 ms. As a result, the wake-up mode initiation timing of the communication circuitry is prior to a paging slot initiation timing by one PN rollover period.

FIG. 3 is a view showing a conventional sleep mode initiation timing of a mobile communication terminal.

As shown in FIG. 3, a mobile communication terminal monitors a paging channel during its own allocated paging slot. In the case where no message for calling the mobile communication terminal is detected in the monitoring step, the control unit of the mobile communication terminal sets up hardware parameters for the sleep mode on the basis of an initiation timing of the next paging slot to be monitored. In other words, at a predetermined time at which the sleep mode has to begin, the control unit generates a sleep mode command signal S0.

After that, if the mobile communication terminal finishes the setup of all hardware parameters for the sleep mode, it enters the sleep mode on the basis of internal period signals (i.e., PN rollover signals) S1, S2, S3, S4, S5, S6 and S7. In the case where the control unit generates a PN rollover signal before completion of set-up of the hardware parameters after the sleep mode command signal S0, the mobile communication terminal establishes a synchronization with a subsequent PN rollover signal (that is, S5 instead of preceding PN rollover signal S4 next to the sleep mode command signal S0), and then enters the sleep mode. As noted above, a power-supply voltage is not applied to the communication circuitry such as an RF unit, demodulator, and a call control processor in the sleep mode in order to reduce power consumption, that is, the mobile communication terminal enters POWER DOWN state in the sleep mode. Thereafter, the mobile communication terminal is woken up by establishing synchronization with a PN rollover signal S6 that is prior to the next paging slot to be monitored by one PN rollover period. Thus, the mobile communication terminal provides the communication circuitry with a power-supply voltage to enter POWER UP state.

However, the above-mentioned paging channel monitoring operation of the mobile communication terminal has a disadvantage in that the time period in which the mobile communication terminal is in the wake-up mode becomes unnecessarily longer. In particular detail, the timing at which the communication circuitry of the mobile communication terminal begins to enter the sleep mode corresponds to the timing of the PN rollover signal S4 next to the sleep mode command signal S0. But the communication circuitry actually establishes synchronization with the PN rollover signal S5 rather than the PN rollover signal S4 because of undesired time delay caused by many processes required for powering off itself, and then enters the sleep mode. As a result, the mobile communication terminal unnecessarily consumes excessive power during at least part of one PN rollover period of S5 to S4. Also, after that, even when the mobile communication terminal is woken up, it establishes synchronization with the PN rollover signal S6 prior to an initiation timing (i.e., a PN rollover signal S7) of the next paging slot, and is then woken up. Consequently, the mobile communication terminal also unnecessarily consumes power during at least part of one PN rollover period of S7 to S6.

Accordingly, it is desirable that, the sleep mode initiation timing of the mobile communication terminal be faster and the wake-up mode initiation timing be delayed in such a way that the undesired power consumption is minimized, resulting in reduction in the length of the wake-up mode period of the terminal.

SUMMARY OF THE INVENTION

Therefore, the present invention has been made in view of the above problems, and it is an object of the present invention to provide a method and apparatus for reducing power consumption of a mobile communication terminal.

It is another object of the present invention to provide a method and apparatus for efficiently performing a transition between a sleep mode and a wake-up mode of a mobile communication terminal.

It is yet another object of the present invention to provide a method and apparatus for minimizing power consumption by reducing a length of a wake-up mode period of a mobile communication terminal.

In accordance with one aspect of the present invention, the above and other objects can be accomplished by the provision of a method for increasing a sleep period of a communication circuitry in a mobile communication terminal, the communication circuitry being periodically and repeatedly woken up for monitoring a paging channel received from a mobile communication system in an allocated paging channel slot period periodically repeated, the communication circuitry sleeping in a non-allocated paging channel slot period. The method comprises the steps of: a) determining hardware parameters for powering off the communication circuitry when a sleep mode command is generated in the allocated paging channel slot period; and b) when the hardware parameters are determined, immediately entering a sleep mode to power off the communication circuitry.

In accordance with another aspect of the present invention, there is provided an apparatus for reducing power consumption in a mobile communication terminal. The apparatus comprises: communication circuitry that is periodically and repeatedly woken up for monitoring a paging channel received from a mobile communication system in an allocated paging channel slot period periodically repeated. The communication circuitry sleeps in a non-allocated paging channel slot period. A control unit determines hardware parameters for powering off the communication circuitry when a sleep mode command is generated in the allocated paging channel slot period, and a sleep mode is entered to power off the communication circuitry immediately upon receiving the hardware parameters.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
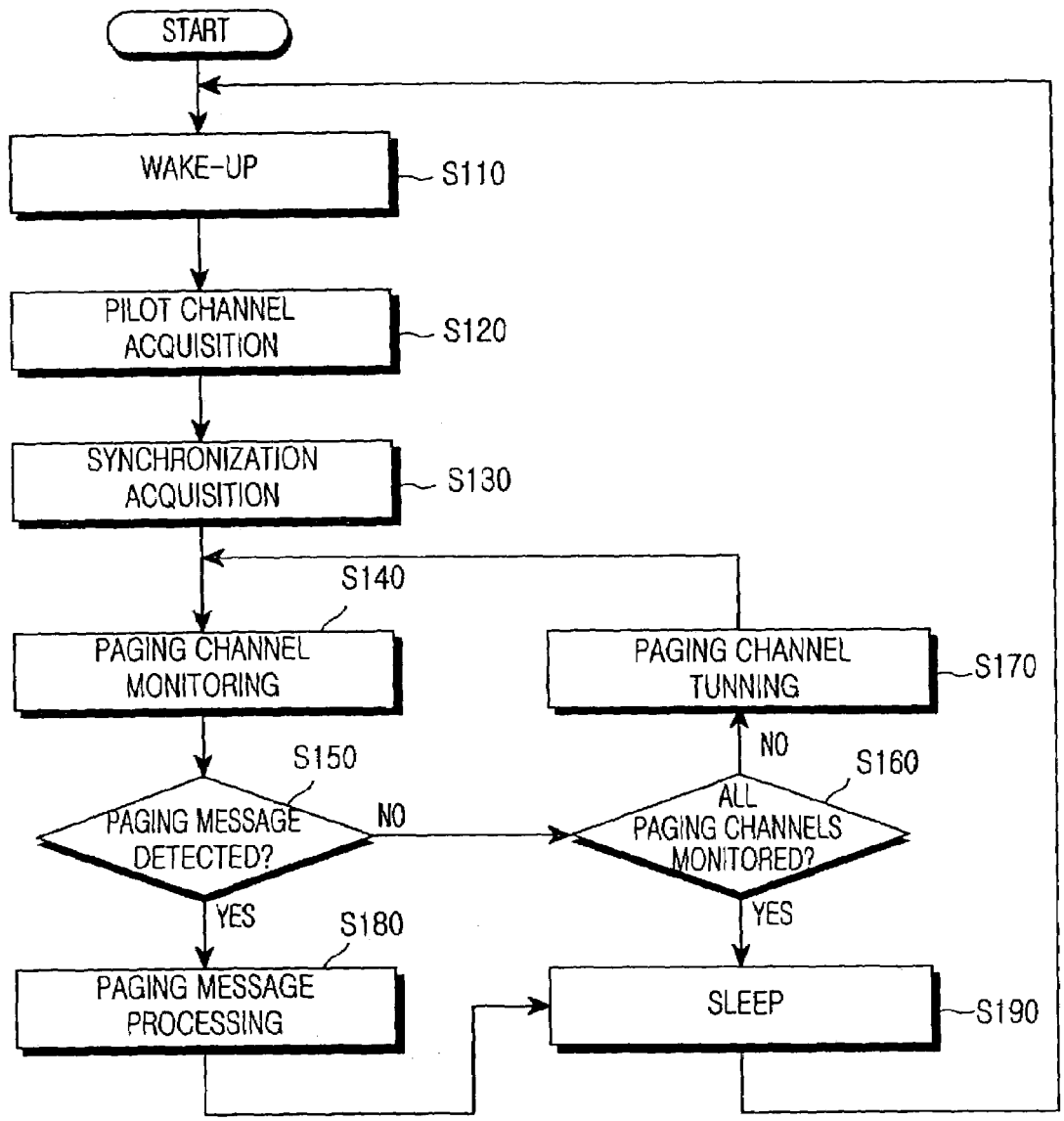
FIG. 1 is a flow chart, illustrating a conventional procedure of monitoring a paging channel.
Figure 2:
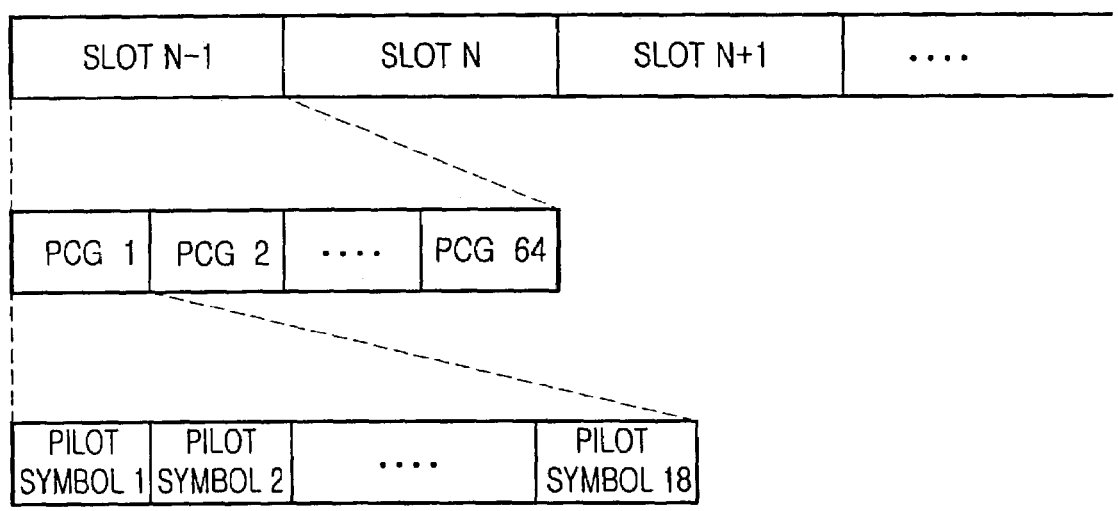
FIG. 2 is a view showing conventional paging channel slots of a CDMA mobile communication system.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted for clarity when it may obscure the subject matter of the present invention. Also, the terms used in the following description are terms defined taking into consideration the functions obtained in accordance with the present invention. The definitions of these terms should be determined based on the whole contents of this specification because they may be changed in accordance with the needs of a user or manager, or a usual practice.

In accordance with the present invention, a mobile communication terminal establishes synchronization with a predetermined command signal generated from a control unit when it enters a sleep mode or a wake-up mode, whereas the conventional mobile communication terminal establishes synchronization with periodic PN rollover signals. In this case, an initiation timing of the wake-up mode of the mobile communication terminal is determined based on a coding method of a paging channel received from a base station, a frame length, and a re-acquisition timing of a base station synchronous signal of a searcher.

Figure 4:
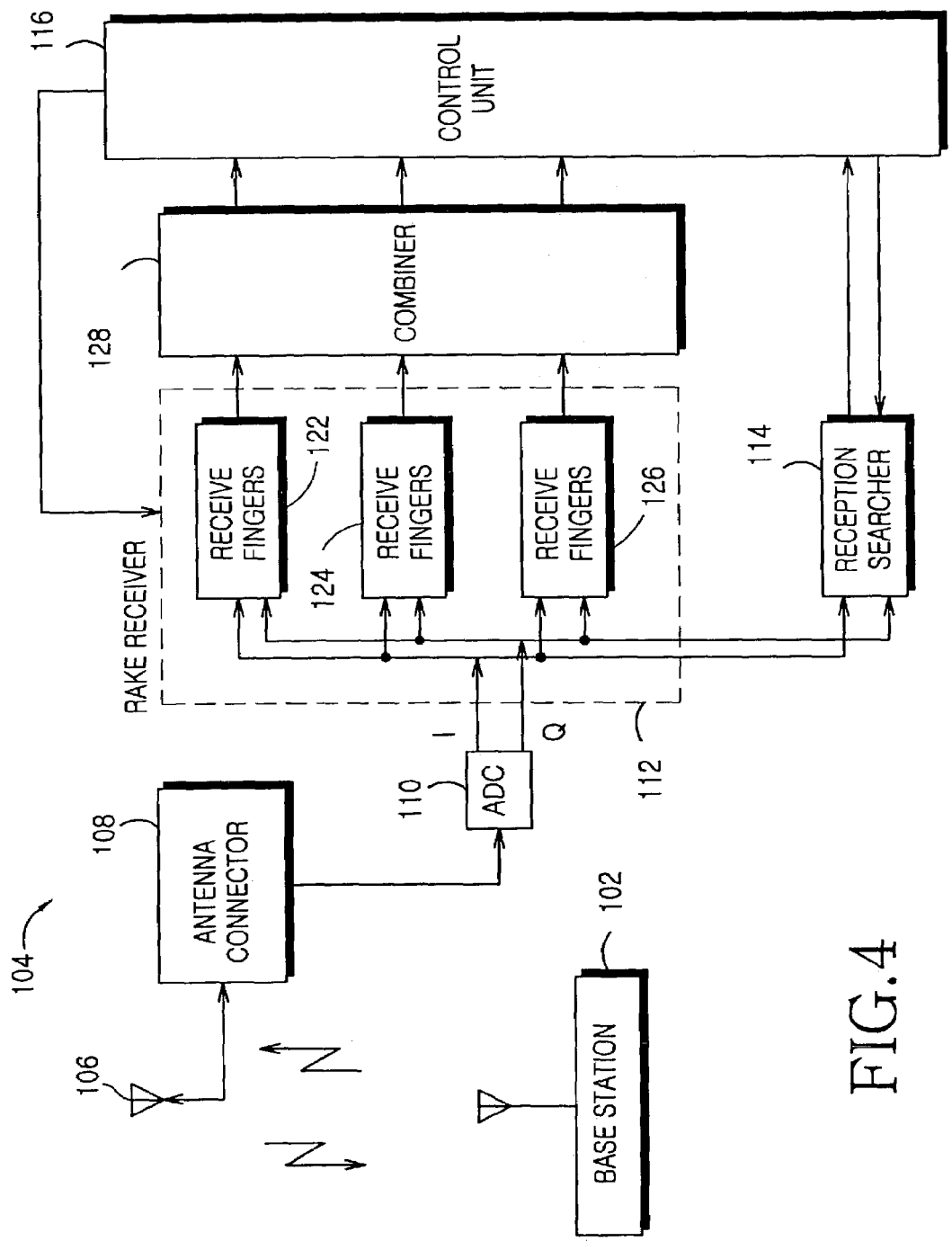
FIG. 4 is a block diagram illustrating an internal construction of a mobile communication system in accordance with the present invention.

FIG. 4 is a block diagram illustrating an internal construction of a mobile communication system in accordance with the present invention. Referring to FIG. 4, the mobile communication system includes a mobile communication terminal 104 and a plurality of base stations 102. Such a mobile communication system may be implemented with a CDMA cellular/PCS (Personal Communication Service) system having a frequency band of 800 MHz or 1800 MHz, which satisfies IS-95, IS-95A and IS-95B functioning as a mobile communication standard, or IMT2000 (International Mobile Telecommunication 2000) system for satisfying IS2000.

As shown in FIG. 4, the base station 102 transmits a spread spectrum signal to the mobile communication terminal 104. While the base station 102 communicates with the mobile communication terminal 104, a plurality of symbols from a traffic channel need a PN Walsh code to spread signals in accordance with a well-known Walsh covering procedure. The mobile communication terminal 104 is assigned a unique Walsh code that is orthogonal to other traffic channels allocated to other mobile communication terminals. The spread spectrum signal is composed of an In-phase signal I and a Quadrature-phase signal Q, which are quadrature-modulated. The I and Q signals need two specific PN sequences to spread signals, respectively. In such a mobile communication system, all base stations employ the same I and Q spreading sequences, respectively.

Besides the aforementioned traffic channel, the base station 102 broadcasts a pilot channel, a synchronous channel, and a paging channel to all mobile communication terminal. As well known in the art, the pilot channel does not need decoding in that it is formed by the same level signal covered by a Walsh code "0". Such a pilot channel is used for a mobile communication terminal 104 to identify many mobile communication systems such as the base stations, perform initialization system acquisition and idle hand-off, identify the initial or delayed propagation, and perform coherent demodulation of synchronous/paging/traffic channels. The synchronous channel is used for the mobile communication terminal 104 to be synchronized with a timing of the base station 102. The paging channel is used for the base station 102 to transmit the paging information to the mobile communication terminal 104.

In the case where the mobile communication terminal 104 is initially powered on or woken up from the sleep mode, it is tuned to a specific RF channel. An antenna connector 108 is adapted to select the specific RF channel received through an antenna 106, converts a signal on the selected RF channel into a base-band signal, and transmits it to ADC (Analog to Digital Converter) 110.

A reception searcher 114 checks a received data stream received from the ADC 110 under the control of a control unit 116. The data stream contains PN sequences corresponding to a spreading RF signal received from at least one or more base stations. The result signals of the reception searcher 114 are applied to a plurality of receive fingers 122, 124 and 126 of a rake receiver 112, as well as to the control unit 116.

Upon receiving the result signals of the reception searcher 114, the receive fingers 122, 124 and 126 demodulate the receive data stream received from the ADC 110 with different time offsets that are changeable in response to a multipath delay within a predetermined window size. In this case, the reception searcher 114 and the receive fingers 122, 124 and 126 PN-despread the receive data stream by employing a PN code produced from a PN generator (not shown). The resulting signals demodulated by the receive fingers 122, 124 and 126 are applied to a combiner 128. Upon receiving the demodulated signals from the receive fingers 122, 124 and 126, the combiner 128 performs a symbol-combination on the demodulated signals and then applies the result signal of the symbol-combination to the control unit 116.

During the wake-up mode of the mobile communication terminal 104, the control unit 116 performs a block-interleaving and viterbi decoding on the symbol-combined signals received from the combiner 128, then analyzes them based on a predetermined radio protocol in association with the base station, and finally determines whether there is a calling message from the base station upon receiving the analyzed results. In the case where the calling message has been detected, the control unit 116 performs signaling with the corresponding calling message. In the case where no calling message has been detected, the control unit 116 commands the communication circuitry containing the antenna connector 108, the ADC 110, the rake receiver 112, the reception searcher 114 and the combiner 128 to enter the sleep mode.

A procedure for a mode conversion between a sleep mode and a wake-up mode of the aforementioned mobile communication terminal will hereinafter be described with reference to FIG. 5.

Figure 5:
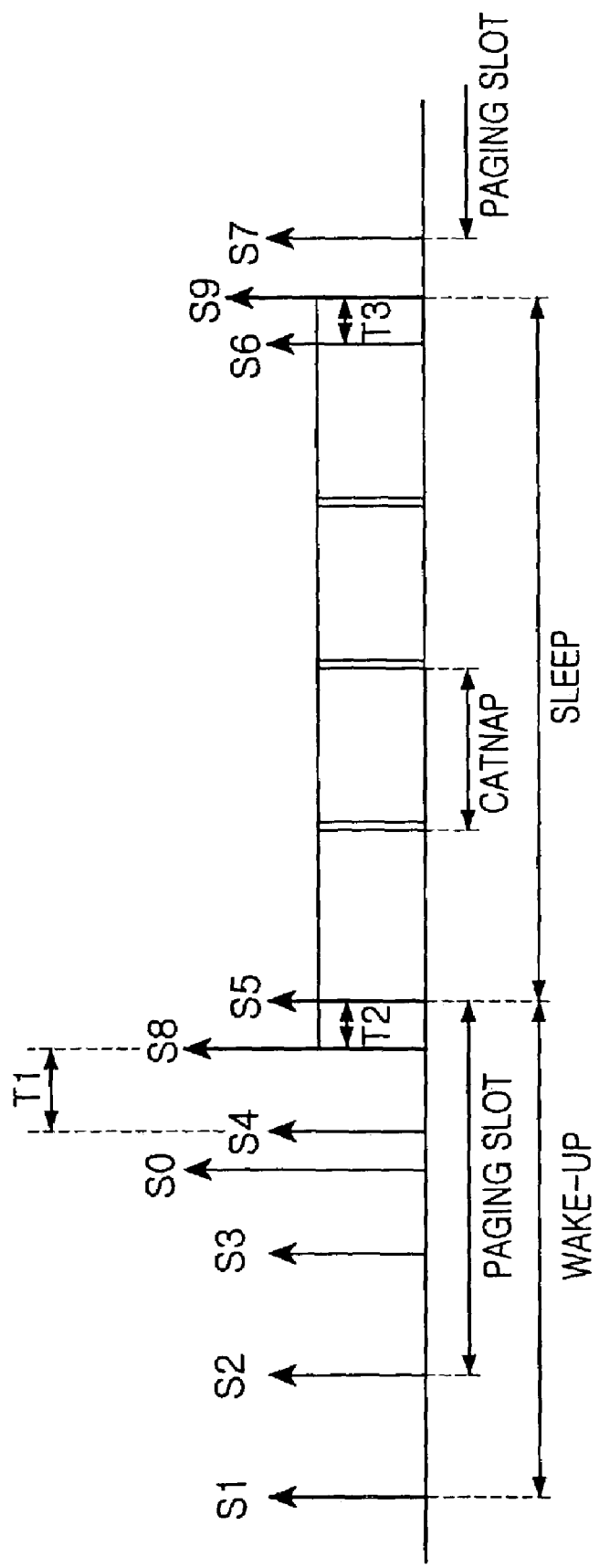
FIG. 5 is a timing diagram illustrating the relationship between a sleep mode and a wake-up mode of a mobile communication terminal in accordance with the present invention.

FIG. 5 is a timing diagram illustrating the relationship between a sleep mode and a wake-up mode of a mobile communication terminal in accordance with the present invention.

With reference to FIG. 5, the mobile communication terminal monitors its own allocated paging slot in the wake-up mode, and determines whether a paging channel message has been detected on the basis of the monitoring result. In the case where no paging channel message has been detected, the control unit 116 determines to enter the sleep mode and generates a sleep mode determination signal S0.

After deciding to enter the sleep mode, the control unit 116 sets up hardware parameters for allowing the communication circuitry to enter the sleep mode, and generates a sleep mode indication signal S8 after the setup of the hardware parameters. Upon receiving the sleep mode indication signal S8, the communication circuitry enters the sleep mode without waiting for the next PN rollover signal S5. Therefore, the communication circuitry reduces power consumption needed for a time period T2. Here, provided that the sleep mode indication signal S8 is generated after the elapsing of a time period T1 after a previous PN rollover signal S4 has been generated, the time period T2 corresponds to "PN rollover period of 26.667 ms−T1".

The control unit 116 generates a wake-up indication signal not at a PN rollover signal timing S6 but at the next timing S9 in order to wake up the mobile communication terminal. This timing S9 is delayed by T3 from the timing of the PN rollover signal S6. Namely, the mobile communication terminal is woken up at the timing S9 which is prior to the paging slot initiation timing S7 by a predetermined period of "PN rollover period of 26.667 ms−T3", whereas the conventional mobile communication terminal is woken up at the timing S6 which is prior to the paging slot initiation timing S7 by one PN rollover period of 26.667 ms. As a result, the mobile communication terminal according to the present invention reduces power consumption of T2 when entering the sleep mode and power consumption of T3 when entering the wake-up mode, resulting in reduction in total power consumption by T2+T3.

A detailed description of the mobile communication terminal will hereinafter be described with reference to FIG. 6.

Figure 6:
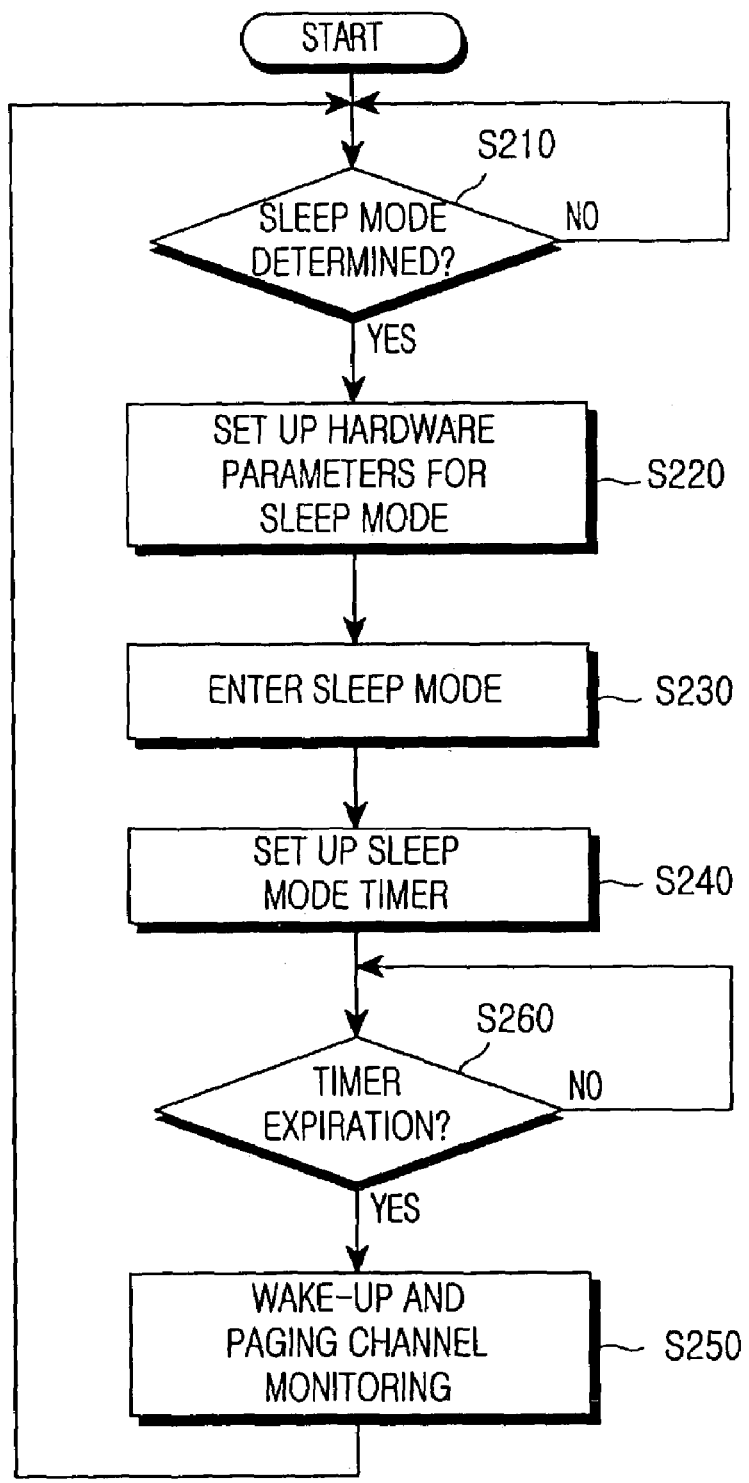
FIG. 6 is a flow chart illustrating a procedure of reducing power consumption of a mobile communication terminal in accordance with the present invention.

FIG. 6 is a flow chart illustrating the process whereby the mobile communication terminal enters the sleep mode and is then woken up from it. With reference to FIG. 6, the mobile communication terminal determines to enter the sleep mode by detecting no paging channel message in its own allocated paging channel and generates sleep mode determination signal S0 at step S210. The mobile communication terminal sets up the hardware parameters for the sleep mode at step S220. After the hardware parameters are set up, the control unit of the mobile communication terminal generates the sleep mode indication signal S8 to enter the sleep mode at step S230. As previously stated, the communication circuitry is powered off in the sleep mode.

Thereafter, in the sleep mode, the control unit sets up a sleep mode timer value used to decide a wake-up mode initiation timing, and starts to drive the sleep mode timer at step S240. In the case where the sleep mode timer stops operating at step S260, the mobile communication terminal is woken up, provides the communication circuitry with a power-supply voltage, and monitors the paging channel at step S250.

As described above, in the case where the mobile communication terminal employs an arbitrary timing instead of a PN code rollover period while performing a mode conversion between the sleep mode and the wake-up mode, the most important matters are how much faster the terminal establishes synchronization re-acquisition with a base station and frame synchronization after the terminal is woken up. If the synchronization re-acquisition with the base station becomes longer or is not accurate because the mobile communication terminal is woken up at the arbitrary timing, the mobile communication terminal may fail to receive a calling message from the base station after being woken up. To solve this problem, the sleep mode timer should be set up by considering a time offset required for entering the sleep mode and another time offset required for entering the wake-up mode. The above step S250 will hereinafter be described with reference to FIGS. 5 and 7.

Referring to FIG. 5, after deciding to enter the sleep mode, the mobile communication terminal calculates a predetermined period of time from the timing S5 to the timing S6 in units of PN code rollover period, and stores it as a reference sleep time period T_sleep. Here, the timing S5 corresponds to a generation timing of the next PN rollover signal that is the nearest signal to sleep mode indication signal S8 (also called a sleep mode command signal), and the timing S6 is the PN rollover signal prior to an initiation timing S7 of the next paging slot to be monitored.

Figure 3:
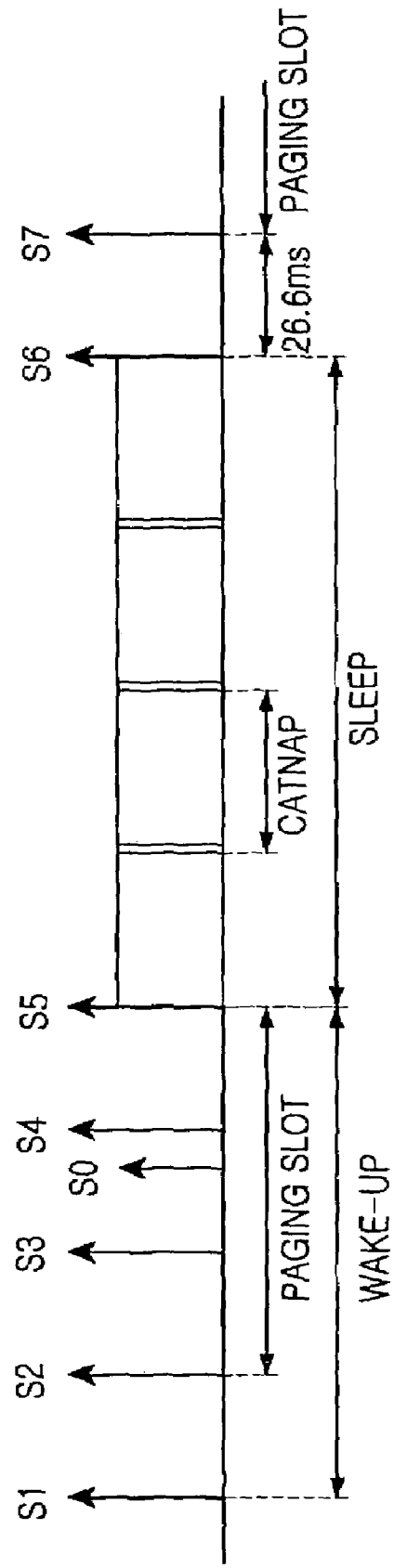
FIG. 3 is a timing diagram illustrating a conventional relationship between a sleep mode and a wake-up mode of a mobile communication terminal.

To delay the wake-up timing of the mobile communication terminal as compared to the conventional PN rollover signal generation timing S6 shown in FIG. 3, the mobile communication terminal calculates and stores a wake-up time offset T3 as a function of a coding method of a paging channel, a frame length, and search performance (e.g., a search speed) of a searcher.

Namely, in order to delay the wake-up timing in the sleep mode, a coding method of the paging channel, a frame length, and search performance of the searcher is considered. In the case of a paging channel used for IS-95A/B or IS-2000, in order to normally demodulate a frame of a paging channel at a demodulation stage, the mobile communication terminal has to employ a demodulation result related to a previous frame because the paging channel employs a continuous mode coding method. Because the frame length is 20 ms, the mobile communication terminal based on IS-95A/B or IS-2000 should be woken up at a predetermined time of 20 ms sooner than an initiation timing of an allocated paging channel slot. Also, after the mobile communication terminal has been woken up, it has to establish synchronization re-acquisition with the base station. For example, in case of IS-95A/B systems, it is well known that the terminal needs a time period of 6 ms for the synchronization re-acquisition. Thus, the mobile communication terminal has to be woken up at a predetermined timing prior to an initiation timing of the allocated paging channel slot by 26 ms, which is equal to one period of a PN rollover signal. Accordingly, the IS-95A/B systems need not set up a wake-up time offset T3.

However, the IS-2000 system employs a F-CCCH (Forward Common Control Channel) instead of a paging channel. The F-CCCH employs a discontinuous mode coding method. In this case, since a demodulation stage of the F-CCCH does not need a demodulation result related to a previous frame, the mobile communication terminal need not be woken up at the predetermined timing of one frame period prior to the allocated paging channel slot. Therefore, the value of T3 is determined within the range of a maximum 20 ms from the allocated paging slot.

Likewise, in the case where the paging channel adapts the discontinuous mode coding method or the length of a paging channel frame is to be shorter than 20 ms, the value of T3 is determined within the range of 0 to one frame period, that is, T3 is greater than 0 and less than one frame period.

The control unit reads a sleep mode initiation timing stored in a RTG (Reference Timing Generator) register included in the combiner 128 of FIG. 4, and calculates a time offset T1 between the sleep mode initiation timing S8 and the PN rollover signal timing S4. For this calculation, the combiner 128 may read the contents stored in the RTG register without receiving a clock signal in the sleep mode.

Figure 7:
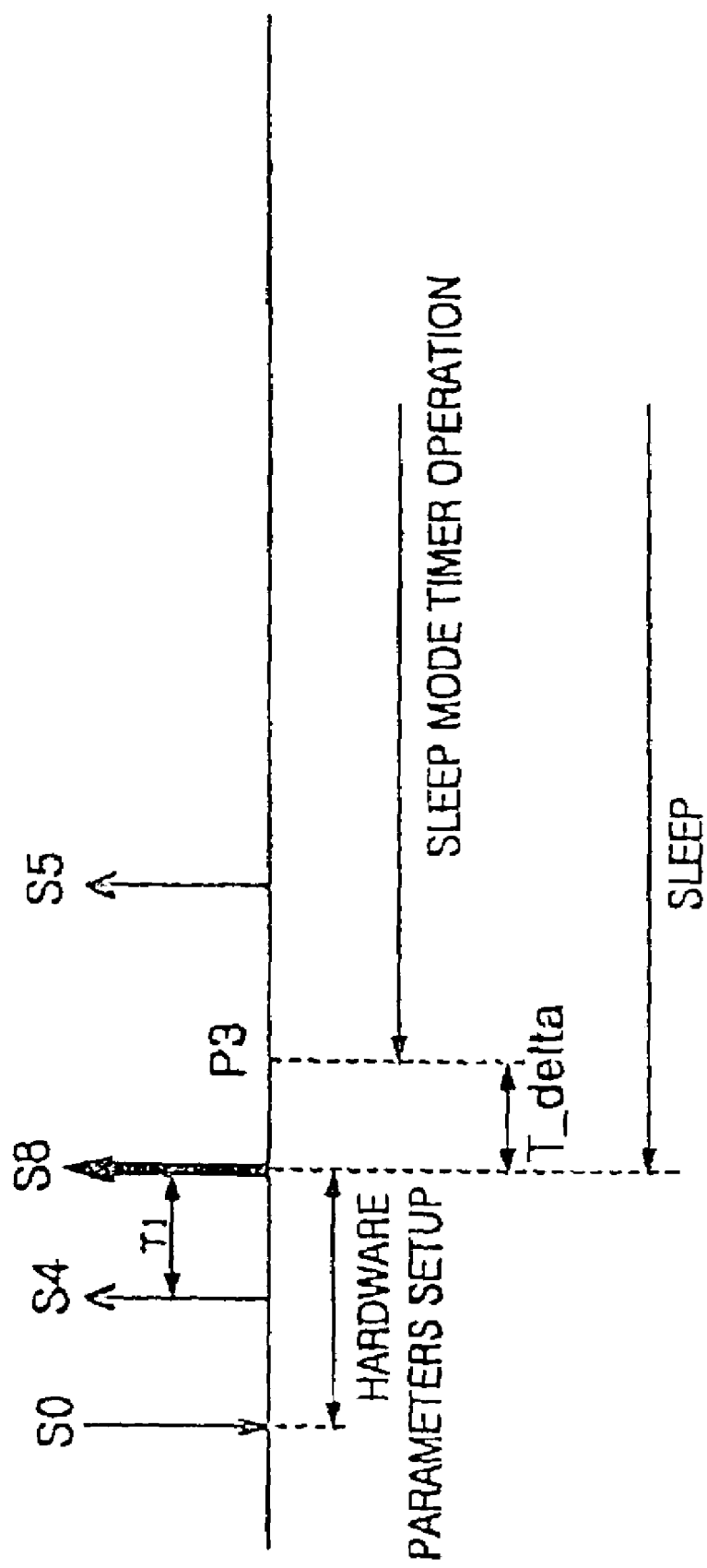
FIG. 7 is a detailed timing diagram illustrating a sleep mode initiation timing of a mobile communication terminal in accordance with the present invention.

As per the above description, the mobile communication terminal calculates and stores a reference sleep time T_sleep and a time offset T3 before entering the sleep mode, and calculates a time offset T1 based on a generation timing of PN rollover signal after entering the sleep mode. T3 is determined to enable the mobile communication terminal to perform synchronization re-acquisition in accordance with a paging channel demodulation method, a frame length, and a search speed. After entering the sleep mode, a sleep mode timer is set on the basis of the calculated time offset T1. However, there may be a time delay in the setting of the timer, as shown in FIG. 7. Provided that the time delay is represented as T_delta, the mobile communication terminal has to store a predetermined count value corresponding to the T_delta as a reference clock unit CHIPX8 in the communication circuitry and compensate for it later in such a way that a timing error of the sleep mode timer can be prevented.

Therefore, to accommodate the delay of setting up the sleep mode timer, it is desirable that the mobile communication terminal determines the entire sleep mode period to be a predetermined time period less than "T_sleep+T2+T3". The reason why the whole sleep mode period is determined to be shorter than "T_sleep+T2+T3" is that undesired error T_delta may occur in synchronization re-acquisition of the woken up terminal. It is difficult for the mobile, communication terminal to accurately predict the value of T_delta when setting up the sleep mode timer. Therefore, it compensates the timing error caused by the T_delta by employing a predictable maximum time delay value. Herein, the predictable maximum time delay value is represented as T_addup.

As a result, the duty cycle of the sleep mode timer is determined to be a predetermined time period of "T_sleep+T2+T3−T_addup".

However, actually, the sleep mode timer is not expired after elapsing of the time period of "T_sleep+T2+T3−T_addup". That is, the mobile communication terminal is previously woken up at a predetermined timing, which is prior to a wake-up mode initiation timing by "T_addup−T_delta". Then, the mobile communication terminal counts the time period of "T_addup−T_delta" in the reference clock unit CHIPX8 and is woken up after the time period of "T_addup−T_delta", thereby compensating the timing error. After expiration of the timer, it is possible for the mobile communication terminal to delay its own wake-mode initiation timing by the time period of "T_addup−T_delta" at the sleep mode timer's expiration timing because the value of T_delta becomes known based on a counting result for the sleep mode timer setup.

After entering the wake-up mode, the mobile communication terminal provides the communication circuitry with a power-supply voltage and monitors a paging channel. In this case, searcher 114 starts a search action for synchronization re-acquisition with a base station. But, a PN state of a PN generator between the searcher 114 and the rake receiver 112 is degraded in that the searcher is not woken up on the basis of PN code rollover period. If the search action is performed on the wrong PN state, a large-sized search window must be employed, resulting in a duty cycle increment of the synchronization re-acquisition. Herein, the PN state means a value of a plurality of transition registers mounted in the PN generator. For example, a CDMA system needs 15 transition registers in that a PN code has a length of $2^{15}-1$, and the 15-bit values of the transition registers are called the PN state.

To obviate the above problem, the mobile communication terminal corrects the PN state between the searcher and the rake receiver before entering the wake-up mode. In other words, because the mobile communication terminal is woken up later than the PN rollover signal S6 by T3, it calculates a PN state as long as T3 and sets it up in the PN generator. The mobile communication terminal needs a large amount of memory to memorize all generable PN states as the PN state. Therefore, as many as 512 PN states are stored in the mobile communication terminal in a 64-chip unit, and then a PN state corresponding to T3/64 is stored in a PN register (not shown) between the searcher and the rake receiver.

Thereafter, if the mobile communication terminal is woken up, then it aligns the timing between the searcher and the rake receiver with a timing of a base station by slewing the stored PN phase by the residual PN state values (i.e., T3 mod 64) not stored in the PN register. Thereby, in the case where the searcher performs a search action again, it can accurately establish synchronization acquisition with the base station. For this operation, the mobile communication terminal sets up a predetermined value in the PN register although no clock signal is detected in the sleep mode just before its wake-up initiation timing.

In the meantime, after entering the sleep mode, it is necessary for the mobile communication terminal to handle a user key input signal. For this operation, the mobile communication terminal divides the whole sleep period into a plurality of short periods each denoted as CATNAP in FIG. 5, and detects whether the user key input signal is periodically generated every CATNAP. Therefore, in the sleep mode, a first CATNAP is determined to be the sum of a predetermined period (determined as an interval of T_sleep) and a period "26.667 ms−T1", and the last CATNAP is determined to be the sum of the predetermined period and a period T3. The remaining CATNAPs other than the above first and last CATNAPs have the same predetermined period as the above predetermined period determined by T_sleep.

As apparent from the above description, a brief description of the effects accomplished by the present invention will hereinafter be described in the following.

According to the present invention, the slotted mode mobile communication terminal minimizes a wake-up time for monitoring a paging channel, thereby reducing its own average standby current. In addition, in case of using a F-CCCH that is not the paging channel, the present invention may be more effective depending on a frame length.

For example, in case of using a frame of 10 ms in the F-CCCH, the prevent invention can accomplish a superior effect similar to that of a quick paging method, which determines whether a paging channel monitoring is performed depending on an indication bit received through an additional channel. Moreover, if the present invention is adapted to the quick paging method, superior results are attained.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for increasing a sleep period of a communication circuitry in a mobile communication terminal, the communication circuitry being repeatedly and periodically woken up for monitoring a paging channel received from a mobile communication system in an allocated paging channel slot period that is periodically repeated, the communication circuitry sleeping in a non-allocated paging channel slot period, the method comprising the steps of:

a) setting up hardware parameters for powering off the communication circuitry when a sleep mode determination command is generated in the allocated paging channel slot period;
   b) when the hardware parameters setup is completed, immediately entering a sleep mode to power off the communication circuitry; and
   c) waking the mobile communication terminal at a preset time period after the next allocated paging channel slot period, said preset time period based on at least one of a coding method, a frame length and searcher parameters.

2. The method as set forth in claim 1, wherein step c) comprises:

calculating a first time period from the sleep mode determination command to an initiation timing of the next allocated paging channel slot period in units of a PN (Pseudo-random Noise) code rollover period, and determining the first time period as a reference sleep time period;
   measuring a second time period to a powering-off timing of the communication circuitry since a sleep mode indication command to the communication circuitry is generated in response to the sleep mode determination command, and storing the second time period as a sleep time offset;
   determining a wake-up time offset considering a time period needed for the mobile communication terminal to establish a synchronization re-acquisition with the mobile communication system;
   after entering the sleep mode, summing up the reference sleep time period, the sleep time offset and the wake-up time offset, and driving a sleep mode timer having a duty cycle of a value where a predetermined maximum time delay value is subtracted from the summed result; and
   when the sleep mode timer is expired, powering on the communication circuitry by entering a wake-up mode.

3. The method as set forth in claim 2, further comprising:

after powering on the communication circuitry, calculating and setting a PN state corresponding to the wake-up time offset.

4. An apparatus for reducing power consumption in a mobile communication terminal, comprising:

a communication circuitry that is repeatedly and periodically woken up for monitoring a paging channel received from a mobile communication system in an allocated paging channel slot period that is periodically repeated, and sleeps in a non-allocated paging channel slot period; and
   a control unit that sets up hardware parameters for powering off the communication circuitry when a sleep mode determination command is generated in the allocated paging channel slot period, enters a sleep mode to power off the communication circuitry immediately upon completing the hardware parameters set-up, and wakes the mobile communication terminal at a preset time period after the next allocated paging channel slot period, said preset time period based on at least one of a coding method, a frame length and searcher parameters.

* * * * *